United States Patent
Huang et al.

(10) Patent No.: US 8,295,194 B2
(45) Date of Patent: Oct. 23, 2012

(54) WIRED NETWORK CONNECTION ESTABLISHING METHOD AND NETWORK DEVICE FOR PERFORMING THE METHOD

(75) Inventors: Liang-Wei Huang, Taipei (TW); Ta-Chin Tseng, Taipei County (TW); Ting-Fa Yu, Yun-Lin Hsien (TW); Lie-Way Fang, Taichung County (TW)

(73) Assignee: Realtek Semiconductor Corp., Hsinchu (TW)

(*) Notice: Subject to any disclaimer, the term of this patent is extended or adjusted under 35 U.S.C. 154(b) by 454 days.

(21) Appl. No.: 12/613,075

(22) Filed: Nov. 5, 2009

(65) Prior Publication Data

US 2010/0122122 A1 May 13, 2010

(30) Foreign Application Priority Data

Nov. 11, 2008 (TW) .............................. 97143488 A

(51) Int. Cl.
 *G01R 31/08* (2006.01)
(52) U.S. Cl. ........ 370/252; 370/247; 370/248; 370/249; 370/250; 370/251
(58) Field of Classification Search .......... 370/246–252; 375/257, 258
See application file for complete search history.

(56) References Cited

U.S. PATENT DOCUMENTS

| 5,771,237 | A * | 6/1998 | Kao .............................. 370/463 |
| 7,477,611 | B2 * | 1/2009 | Huff ............................. 370/252 |
| 7,826,383 | B2 * | 11/2010 | Savard et al. ................. 370/249 |
| 2007/0111687 | A1 | 5/2007 | Weng | |
| 2007/0167184 | A1 | 7/2007 | Lee | |
| 2007/0211643 | A1 | 9/2007 | Hsieh | |

* cited by examiner

*Primary Examiner* — Christopher Grey
(74) *Attorney, Agent, or Firm* — McNees Wallace & Nurick LLC

(57) ABSTRACT

A wired network connection establishing method includes the steps of: configuring two network devices to exchange connection capacity information with each other through first and second twisted pair cables of a network cable, the connection capacity information including at least a first connection mode using four of the twisted pair cables, a second connection mode using three of the twisted pair cables, and a third connection mode using two of the twisted pair cables; configuring the two network devices to detect a number of the twisted pair cables in the network cable capable of supporting a normal connection; and configuring the two network devices to determine which one of the first, second, and third connection modes is to be used for establishing a connection based on the number of the twisted pair cables capable of supporting a normal connection.

12 Claims, 4 Drawing Sheets

WIRED NETWORK CONNECTION ESTABLISHING METHOD AND NETWORK DEVICE FOR PERFORMING THE METHOD

CROSS-REFERENCE TO RELATED APPLICATION

This application claims priority of Taiwanese application no. 097143488, filed on Nov. 11, 2008.

BACKGROUND OF THE INVENTION

1. Field of the Invention

This invention relates to a network connection establishing method, more particularly to a wired network connection establishing method.

2. Description of the Related Art

Referring to FIG. 1, 1000Base-T and 10GBase-T Ethernet standards specify use of a network cable including four twisted pair cables and capable of supporting high-performance, full-duplex data transmission between network devices within 100 meters. If the network devices at ends of the network cable (namely, a master network device 1, such as a switch, and a slave network device 2, such as a network interface card (NIC)) comply with the 1000Base-T Ethernet standard specifications, then a data transmission rate of each of the four twisted pair cables in the network cable is 250 Mbps, and the data transmission rate of the four twisted pair cables together is accordingly 1000 Mbps (that is, 1 Gbps). If the master network device 1 and the slave network device 2 comply with the 10GBase-T Ethernet standard specifications, then the data transmission rate of each of the four twisted pair cables in the network cable is 2.5 Gbps, and the data transmission rate of the four twisted pair cables together is accordingly 10 Gbps. Notably, 1000Base-T and 10GBase-T Ethernet standard specifications require use of all four of the twisted pair cables in the network cable for data transmission. Therefore, if one or two of the four twisted pair cables is broken, it is possible that a network connection cannot be established.

The conventional network cable includes four of the twisted pair cables. However, since a network device operating under the 10Base-T or 100Base-T Ethernet network standards only needs first and second ones of the twisted pair cables in the network cable, some vendors provide a type of network cable that includes four connector ends but only two of the twisted pair cables. Often, users are unaware that the network cable they are using includes only two of the twisted pair cables.

Consequently, when a network device supporting the 1000Base-T standard or the 10Gbase-T Ethernet standard establishes a connection with another network device supporting the 1000Base-T or 10GBase-T standard through the network cable that includes only two of the twisted pair cables, the connection can only support data transmission rates associated with Ethernet standards specifying use of two of the twisted pair cables, that is, data transmission rates of 10 Mbps or 100 Mbps, and cannot support the data transmission rates of 1 Gbps or 10 Gbps associated with the 1000Base-T and 10GBase-T Ethernet standards, which require use of all four of the twisted pair cables in the network cable for data transmission. Thus, the data transmission rate of a connection between two network devices can be restricted due to the number or condition of the twisted pair cables in the network cable, despite connection capacities of the network devices themselves supporting higher data transmission rates of 1 G or 10 G.

SUMMARY OF THE INVENTION

Therefore, an object of the present invention is to provide a wired network connection establishing method that is capable of dynamically adjusting a data transmission rate at which two network devices establish a connection in accordance with a number of twisted pair cables capable of supporting a normal connection in a network cable that connects the two network devices.

Another object of the present invention is to provide a network device that is capable of dynamically adjusting a data transmission rate at which a connection is established with a remote network device in accordance with a number of twisted pair cables capable of supporting a normal connection in a network cable that connects the network device with the remote network device.

According to one aspect of the present invention, there is provided a wired network connection establishing method that is adapted for a wired network. The wired network includes a network cable and two devices connected through the network cable. The network cable includes a plurality of twisted pair cables, the plurality of twisted pair cables including at least first and second twisted pair cables.

The wired network connection establishing method comprises the steps of: configuring the two network devices to exchange connection capacity information with each other through the first and second twisted pair cables in the network cable; configuring the two network devices to detect the number of the twisted pair cables that are capable of supporting a normal connection in the network cable; and configuring the two network devices to determine whether to use four of the twisted pair cables, three of the twisted pair cables, or two of the twisted pair cables to establish a connection in accordance with the number of the twisted pair cables that are capable of supporting a normal connection.

In an embodiment of the invention, when it is determined that four of the twisted pair cables in the network cable are capable of supporting a normal connection, and the two network devices both support a connection using four of the twisted pair cables, then the two network devices are configured to establish a connection using four of the twisted pair cables. When it is determined that only three of the twisted pair cables are capable of supporting a normal connection, and the two network devices both support a connection using three of the twisted pair cables, then the two network devices are configured to use three of the twisted pair cables to establish a connection. When it is determined that only two of the twisted pair cables are capable of supporting a normal connection, and the two network devices both support a connection using two of the twisted pair cables, then the two network devices are configured to establish a connection using two of the twisted pair cables.

According to another aspect of the present invention, there is provided a network device that is adapted for establishing a connection with a remote network device through a network cable. The network device includes four receiving/transmitting circuits for connecting respectively with four twisted pair cables in the network cable, and a controller coupled to the four receiving/transmitting circuits for controlling operation of the four receiving/transmitting circuits. The controller exchanges connection capacity information with the remote network device through first and second ones of the four twisted pair cables in the network cable, detects a number of the twisted pair cables in the network cable capable of supporting a normal connection among the four twisted pair cables in the network cable, and controls the four receiving/transmitting circuits to establish a connection with the remote network device using four of the twisted pair cables, three of the twisted pair cables, or two of the twisted pair cables based on the number of the twisted pair cables capable of supporting a normal connection and the connection capacity information of both the network device and the remote network device.

In an embodiment of the invention, when the controller detects that the number of the twisted pair cables in the network cable capable of supporting a normal connection is four, and the remote network device supports a connection using four of the twisted pair cables, the controller controls the four receiving/transmitting circuits to establish a connection with the remote network device using the four twisted pair cables in the network cable. When the controller detects that the number of the twisted pair cables in the network cable capable of supporting a normal connection is three, and the remote network device supports a connection using three of the four twisted pair cables, the controller controls three of the four receiving/transmitting circuits to establish a connection with the remote network device using three of the four twisted pair cables in the network cable. When the controller detects that the number of the twisted pair cables in the network cable capable of supporting a normal connection is two, and the remote network device supports a connection using two of the four twisted pair cables, the controller controls two of the four receiving/transmitting circuits to establish a connection with the remote network device using two of the four twisted pair cables in the network cable.

In an embodiment of the invention, the network device further includes four line detecting circuits coupled respectively to the four receiving/transmitting circuits, each of the line detecting circuits detecting whether one of the four twisted pair cables that is connected to the corresponding one of the four receiving/transmitting circuits is a broken line, and transmitting a detection result to the controller.

Moreover, many current network devices connect with the four twisted pair cables of the network cable through an RJ45 connector. The RJ45 connector includes four transmitting pins and four receiving pins that correspond to a number of transmitting units and receiving units of the network device, respectively, and to the number of the twisted pair cables in a conventional network cable. Therefore, the present invention is also capable of controlling a portion of the transmitting units corresponding to the twisted pair cables in the network cable that are broken lines not to operate or not to transmit signals of significance to the other one of the network devices. Likewise, the present invention is capable of controlling a portion of the receiving units corresponding the twisted pair cables in the network cable that are broken lines not to operate or not to receive signals from the other one of the network devices. Moreover, when the data transmission flow rate is low, a portion of the transmitting units and a portion of the receiving units can be controlled not to operate. Therefore, the present invention reduces power consumption through controlling a portion of the transmitting units and receiving units not to operate when there is an insufficient number of the twisted pair cables in the network cable or an insufficient number of the twisted pair cables capable of supporting a normal connection among a sufficient number of the twisted pair cables, or when there is a reduction in the data transmission flow rate that makes operation of all the receiving units and transmitting units unnecessary.

Therefore, according to yet another aspect of the present invention, there is provided a wired network connection establishing method that is adapted for a communications device. The communications device is coupled to a network cable through a connector, and is connected to another communications device through the network cable. The connector includes (n) transmitting pins and (m) receiving pins, and the communications device has (n) transmitting units for connecting respectively to the (n) transmitting pins, and (m) receiving units for connecting respectively to the (m) receiving pins.

The wired network connection establishing method comprises the steps of: A) controlling (p) of the (n) transmitting units to transmit signals to the another communications device through (p) of the (n) transmitting pins and the transmission cable; B) controlling (q) of the (m) receiving units to receive signals from the another communications device through (q) of the (m) receiving pins and the transmission cable; and C) controlling a remaining (n-p) of the (n) transmitting units not to transmit signals to the another communications device; and controlling a remaining (m-q) of the (m) receiving units not to receive signals from the another communications device.

According to still another aspect of the present invention, there is provided a communications device for performing the above-described method that is adapted for coupling with a transmission cable through a connector, and connecting to another communications device through the transmission cable. The connector includes (n) transmitting pins and (m) receiving pins.

The communications device comprises (n) transmitting units, (m) receiving units, and a controller coupled to the (n) transmitting units and the (m) receiving units. The (n) transmitting units are for connecting respectively to the (n) transmitting pins, (p) of the (n) transmitting units transmitting signals to the another communications device through (p) of the (n) transmitting pins and the transmission cable, wherein (p) is a positive integer that is less than (n). The (m) receiving units are for connecting respectively to the (m) receiving pins, (q) of the (m) receiving units receiving signals from the another communications device through (q) of the (m) receiving pins and the transmission cable, wherein (q) is a positive integer that is less than (m). The controller controls (p) of the (n) transmitting units to transmit signals to the another communications device, controls a remaining (n-p) of the (n) transmitting units not to transmit signals to the another communications device, controls (q) of the (m) receiving units to receive signals from the another communications device, and controls a remaining (m-q) of the (m) receiving units not to receive signals from the another communications device.

The communications device and the another communications device together support a maximum data transmission rate of (S) bits per second, and the controller controls the communications device to operate at an actual maximum data transmission rate of (X) bits per second, wherein (X) is less than (S). Preferably, (X) is equal to (p/n)*S, that is, the ratio of a number of the transmitting units in operation to a total number of the transmitting units multiplied by the maximum data transmission rate, wherein the maximum data transmission rate (S) is one of 10 Gbps, 1 Gbps, 100 Mbps, and 10 Mbps.

In an embodiment of the invention, the controller further detects a line status of the transmission cable so as to generate a detection result, and determines a maximum number of the transmitting units and receiving units to operate based on the detection result.

The present invention determines a connection capacity other than one conforming with Ethernet network standard specifications for two network devices that are to establish a connection, detects the number of the twisted pair cables capable of supporting a normal connection through detecting mechanisms of the two network devices, and then dynamically adjusts the connection mode (data transmission rate mode) in which the two network devices establish a connection, so that even when the number of the twisted pair cables capable of supporting a normal connection does not comply with Ethernet network standard specifications, the two network devices are still capable of establishing a connection at a comparatively lower data transmission rate. In this manner, the present invention enables the two network devices to establish a connection despite an insufficient number of the twisted pair cables in the network cable capable of supporting a normal connection.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
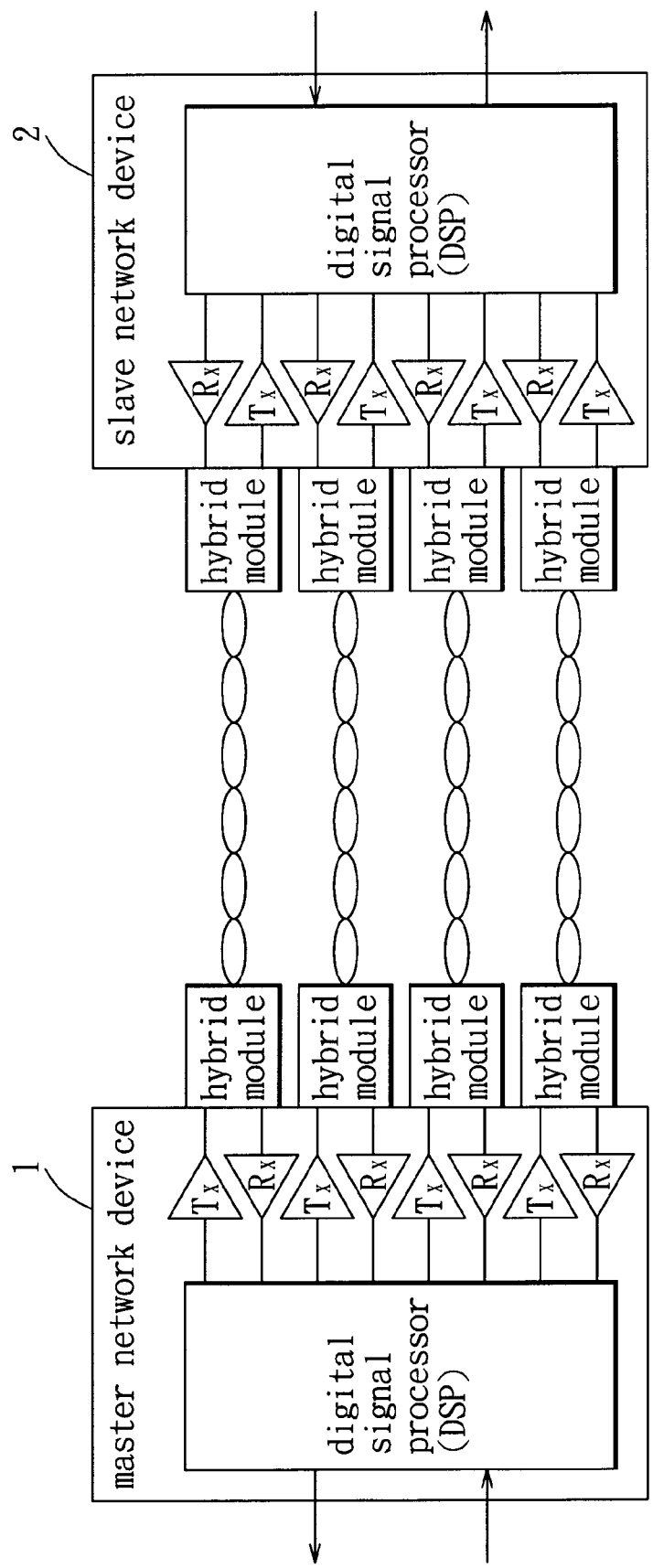
FIG. 1 is a schematic system block diagram for illustrating data transmission through four twisted pair cables of a network cable in compliance with 1000Base-T and 10GBase-T Ethernet network standards.
Figure 2:
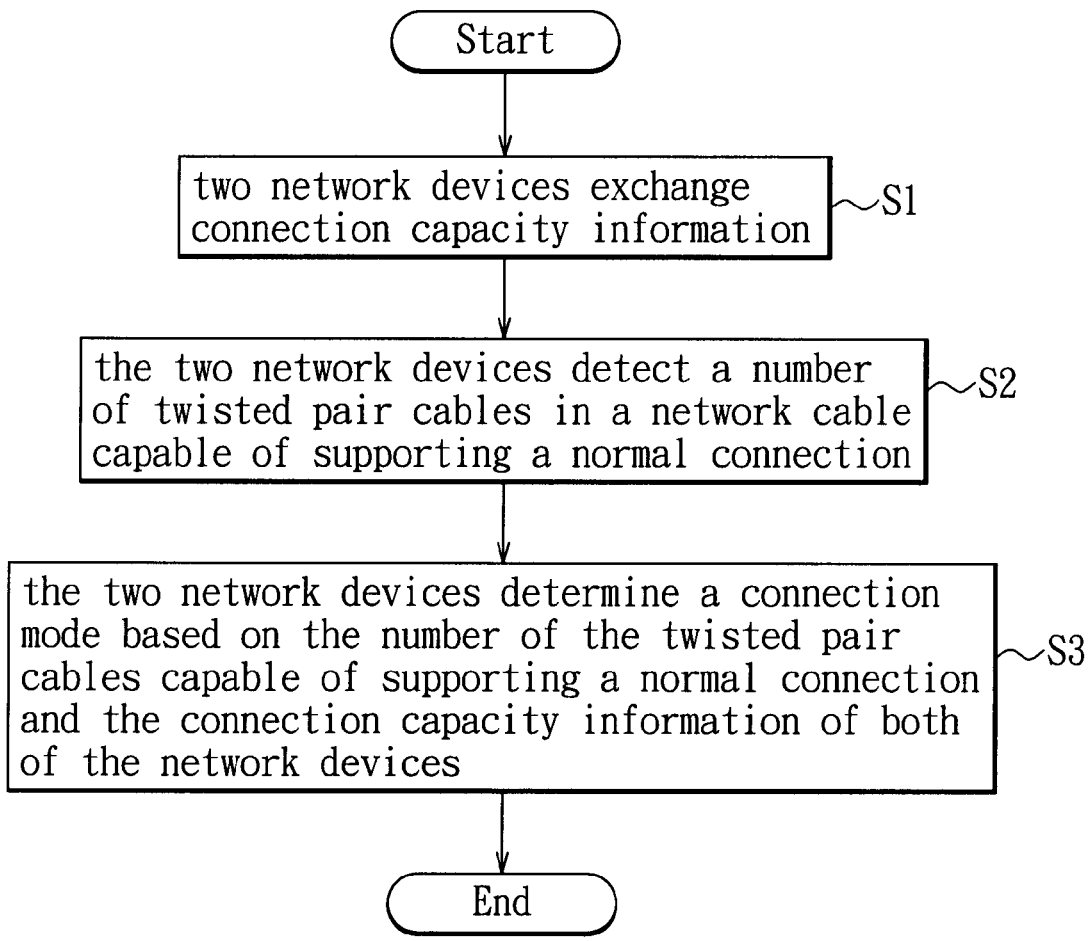
FIG. 2 is a flowchart for illustrating a preferred embodiment of a wired network connection establishing method according to the present invention.
Figure 3:
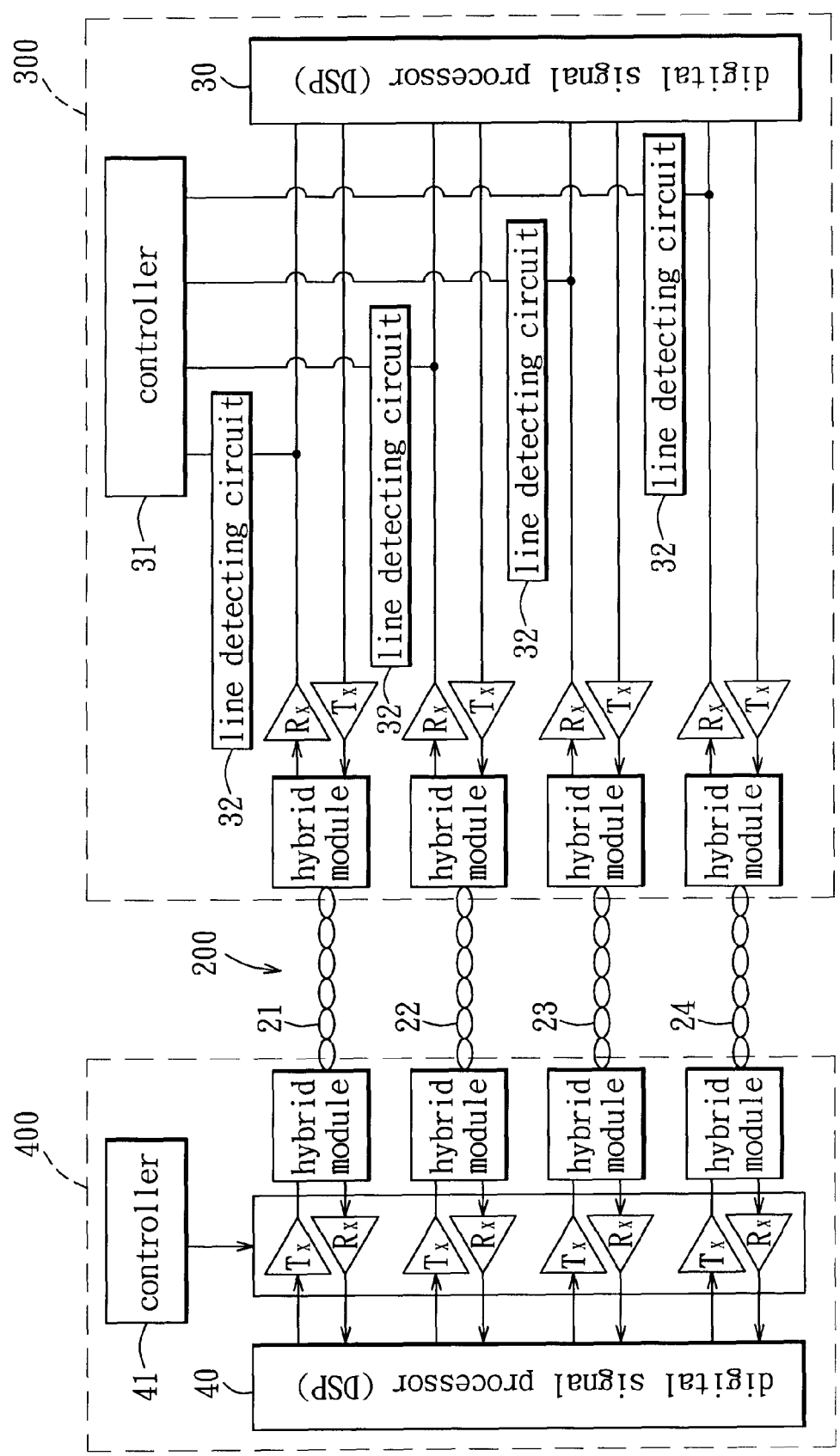
FIG. 3 is a schematic system block diagram for illustrating main circuits of a preferred embodiment of a network device according to the present invention, and a manner in which the network device is connected to another network device.

FIG. 2 illustrates the preferred embodiment of a wired network connection establishing method according to the present invention. The wired network connection establishing method is adapted for a wired network as shown in FIG. 3. The wired network includes a network cable 200 and two network devices 300,400 connected through the network cable 200. The network cable 200 includes a plurality of twisted pair cables, the plurality of twisted pair cables including at least first and second twisted pair cables. In this embodiment, the wired network is an Ethernet network, and the network cable 200 is a conventional network cable including four of the twisted pair cables 21,22,23,24. Also in this embodiment, the network device 300 is a master network device, such as a switch, and the network device 400 is a slave network device, such as a network interface card (NIC), although this invention is not limited to such.

With further reference to FIG. 3, the two network devices 300, 400 of this embodiment, which can be referred to alternatively as Ethernet communications devices, include respectively four receiving/transmitting circuits for connecting respectively with the four twisted pair cables 21,22,23,24 in the network cable 200, each of the receiving/transmitting circuits including a receiving unit (Rx) and a transmitting unit (Tx). The two network devices 300,400 further include a digital signal processor (DSP) 30,40 connected to each of the receiving units (Rx) and each of the transmitting units (Tx) for processing received data and data to be transmitted, and a controller 31,41 coupled to the four receiving/transmitting circuits for controlling operation of the four receiving/transmitting circuits.

Figure 4:
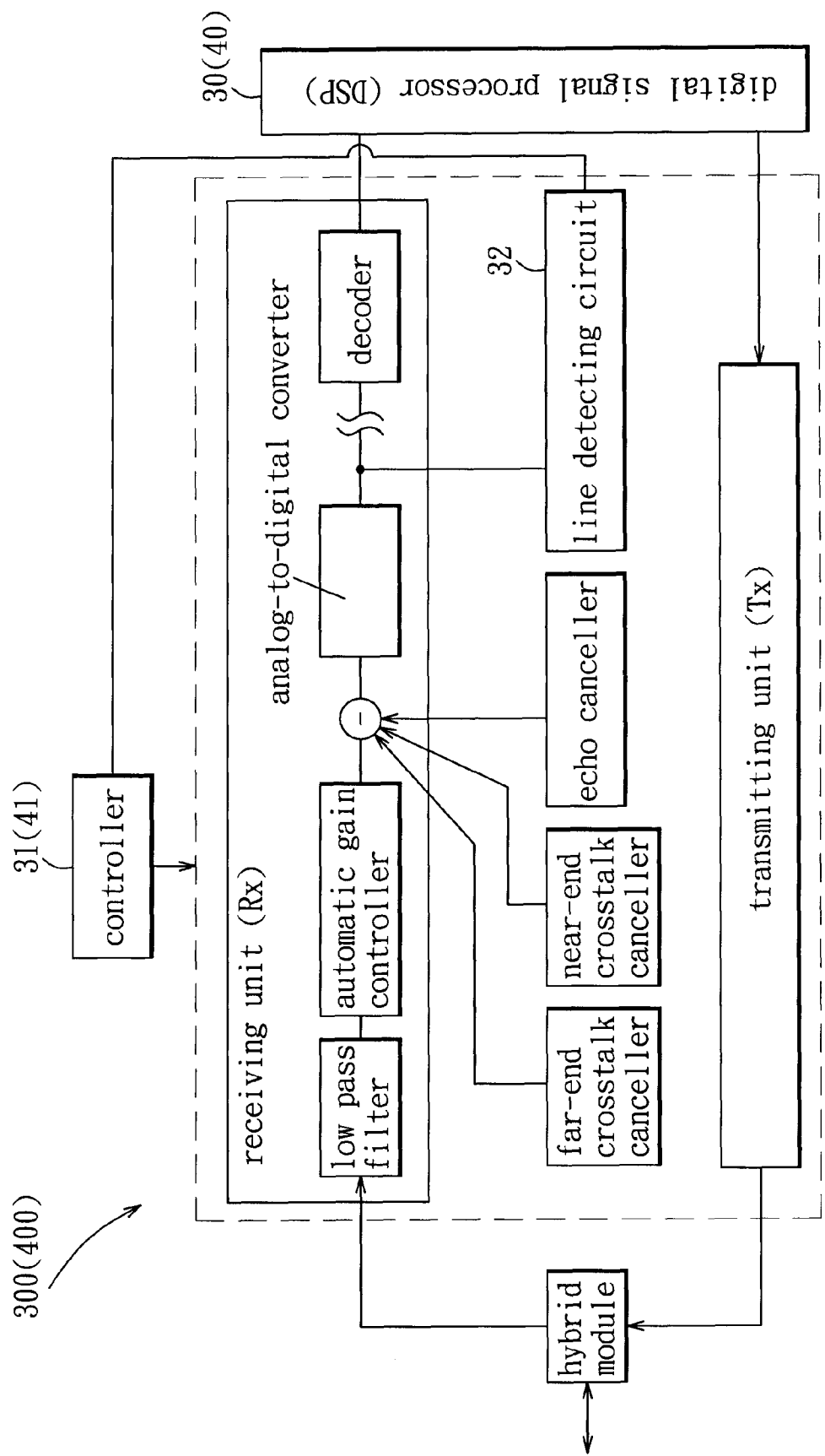
FIG. 4 is a schematic system block diagram for illustrating a receiving unit of the preferred embodiment of a network device.

Referring to FIG. 4, each of the receiving units (Rx) of the network devices 300,400 includes a low pass filter, an automatic gain controller, an analog-to-digital converter, and a decoder. In addition, each of the network devices 300,400 includes an echo canceller, a near-end crosstalk canceller and a far-end crosstalk canceller, for canceling interference caused by echo, near-end crosstalk and far-end crosstalk, respectively.

In contrast to the slave network device 400, the master network device 300 includes four line detecting circuits 32 coupled respectively to the four receiving units (Rx) of the four receiving/transmitting circuits, each of the line detecting circuits 32 detecting whether one of the four twisted pair cables 21,22,23,24 that is connected to the corresponding one of the four receiving/transmitting circuits is a broken line, and transmitting a detection result to the controller 31. The controller 31 then controls operation of each of the four receiving/transmitting circuits based on the detection result.

Referring to FIGS. 2 and 3, the preferred embodiment of the wired connection establishing method includes the following steps.

When it is desired to establish a connection, that is, a data transmission channel, between the master network device 300 and the slave network device 400, the two network devices 300,400 perform a negotiating step, step S1. In step S1, the network devices 300,400, through respective ones of the controllers 31,41, confirm each other's connection capacity information via link pulses transmitted through the first and second twisted pair cables 21,22, respectively, in accordance with Ethernet standard specifications and preferably using a conventional mechanism such as an N-way mechanism.

The connection capacity information includes at least a first connection mode using four of the twisted pair cables 21,22,23,24, a second connection mode using three of the twisted pair cables 21,22,23,24, and a third connection mode using two of the twisted pair cables 21,22,23,24. Preferably, the connection modes are indicated using respective identification codes, such as '0001' for indicating a 10 Mbps data transmission rate mode, '0002' for indicating a 100 Mbps data transmission rate mode, '0003' for indicating a 500 Mbps data transmission rate mode, '0004' for indicating a 750 Mbps data transmission rate mode, '0005' for indicating a 1 Gbps data transmission rate mode, '0006' for indicating a 5 Gbps data transmission rate mode, '0007' for indicating a 7.5 Gbps data transmission rate mode, and '0008' for indicating a 10 Gbps data transmission rate mode.

In accordance with the identification codes exemplified above, when the master network device 300 transmits '0003', '0004', '0005', '0006', '0007', and '0008' to the slave network device 400, and the slave network device 400 transmits '0003', '0004', and '0005' to the master network device 300, the network devices 300,400 can then determine the connection capacity of the other of the network devices 300,400 based on the identification codes that are received, and accordingly negotiate a maximum data transmission rate mode that is supportable by both of the network devices 300,400, such as the 1 Gbps data transmission rate mode, and at the same time record others of the data transmission rate modes that the other of the network devices 300,400 is capable of supporting, such as the 500 Mbps and 750 Mbps data transmission rate modes.

After the network devices 300,400 have determined each other's connection capacity, a line detecting step, S2, is performed, in which a number of the twisted pair cables 21,22, 23,24 in the network cable 200 capable of supporting a normal connection are detected. The master network device 300, through each of the line detecting circuits 32 that are connected respectively to the receiving units (Rx), transmits a detection signal, and then detects whether each of the four twisted pair cables 21,22,23,24 reflects the detection signal in response. If one of the four twisted pair cables 21,22,23,24 reflects the detection signal in response, this indicates that the detection signal cannot be transmitted through the one of the four twisted pair cables 21,22,23,24, and it is therefore determined that the one of the four twisted pair cables 21,22,23,24 is a broken line or is otherwise unable to support a normal connection.

At the same time, the controller 41 of the slave network device 400 detects whether each of the receiving units (Rx) of the four receiving/transmitting circuits that are connected respectively to the four twisted pair cables 21,22,23,24 receives the detection signal transmitted from the master network device 300. If one of the receiving units (Rx) does not receive the detection signal, then it is determined that the twisted pair cable 21,22,23,24 corresponding to the one of the receiving units (Rx) is a broken line or is otherwise unable to support a normal connection.

Through performing the above-described line detecting step, step S2, the controllers 31,41 of both of the network devices 300,400 determine the number of the twisted pair cables 21,22,23,24 in the network cable 200 that can be used for data transmission. Subsequently, in a connection establishing step, step S3, the controllers 31,41 control respectively the receiving/transmitting circuits of the network devices 300,400 to establish a connection in accordance with the number of the twisted pair cables 21,22,23,24 capable of supporting a normal connection and the data transmission rate modes that both of the network devices 300,400 are capable of supporting. For instance, if the detection result indicates that only a fourth one of the twisted pair cables 24 is a broken line, then the network devices 300,400 can establish a connection through the other three of the twisted pair cables 21,22,23 using the 750 Mbps data transmission rate mode, assuming each of the twisted pair cables 21,22,23,24 supports a 250 Mbps data transmission rate. On the other hand, if the detection result indicates that only the first and second twisted pair cables 21,22 are capable of supporting a normal connection, then the network devices 300,400 can establish a connection through the first and second twisted pair cables 21,22 using the 500 Mbps data transmission rate mode, again assuming each of the twisted pair cables 21,22,23,24 supports a 250 Mbps data transmission rate.

Clearly, if the maximum data transmission rate mode that both of the network devices 300,400 are capable of supporting were the 10 Gbps data transmission rate mode, that is, the other one of the data transmission rate modes that uses all four of the twisted pair cables 21,22,23,24, then when only three of the four twisted pair cables 21,22,23 are capable of supporting a normal connection, the network devices 300,400 use the 7.5 Gbps data transmission rate mode to establish a connection. Accordingly, when only the first and second twisted pair cables 21,22 are capable of supporting a normal connection, the network devices 300,400 use the 5 Gbps data transmission rate mode to establish a connection. It is noted that connection failure does not occur while operating in the above-described data transmission rate modes.

Therefore, when the network devices 300,400 both confirm support of a connection capacity other than one specified by Ethernet standards, and the number of the twisted pair cables 21,22,23,24 capable of supporting a normal connection is detected by the network devices 300,400, an actual maximum data transmission rate mode (connection mode) between the two network devices 300,400 is adjusted automatically, preferably so as to equal the ratio of the number of the twisted pair cables 21,22,23,24 capable of supporting a normal connection to a total number of the twisted pair cables 21,22,23,24 multiplied by the maximum data transmission rate that is supported by both of the network devices 300,400.

As a result, when the number of the twisted pair cables 21,22,23,24 capable of supporting a normal connection does not conform with the Ethernet standards, such as when only two of the twisted pair cables 21,22 are capable of supporting a normal connection, in comparison with the prior art, in which compliance with Ethernet standards for two of the twisted pair cables 21,22 allows data transmission rates of only 10 Mbps or 100 Mbps, the network devices 300,400 of the preferred embodiment can operate at a comparatively higher data transmission rate of 5 Gbps. The present invention thus resolves the issues in which the data transmission rate at which a network device is able to establish a connection is restricted or establishment of connection is made impossible due to an insufficient number of the twisted pair cables 21,22, 23,24 capable of supporting a normal connection according to network standard specifications.

Moreover, when one of the four twisted pair cables 21,22, 23,24 is a broken line and data cannot be transmitted, and the receiving/transmitting circuit corresponding to the one of the twisted pair cables 21,22,23,24 that is a broken line has been idled, other circuits inside receiving/transmitting circuits connected to unbroken ones of the twisted pair cables 21,22, 23,24 that are associated with the idle receiving/transmitting circuit, such as the near-end crosstalk canceller, the far-end crosstalk canceller, etc. can be shut down so as to prevent unnecessary power consumption.

It is worth noting that when only two or three of the twisted pair cables 21,22,23,24 are used for data transmission, the controller 31,41 can control the transmitting units (Tx) of idle ones of the receiving/transmitting circuits to generate dummy data, such as that consisting of all zeros, for transmission to the receiving unit (Rx) of the other network device so as to ensure smooth operation of the back end DSP 30,40, or control the receiving units (Rx) of idle ones of the receiving/ transmitting circuits to generate dummy data, again such as that consisting of all zeros, for transmission to the back end DSP 30(40), or re-allocate data to be sent to the transmitting units (Tx) of the receiving/transmitting circuits that are in operation.

In addition, a connector that connects the network device 300,400 to the four twisted pair cables 21,22,23,24 of the network cable 200, which is preferably an RJ45 connector, includes four transmitting pins and four receiving pins that correspond to the number of the transmitting units (Tx) and the number of the receiving units (Rx) of the network device 300,400, respectively, and to the number of the twisted pair cables 21,22,23,24 in the conventional network cable 200. Therefore, the present invention is also capable of controlling a portion of the transmitting units (Tx) corresponding to the twisted pair cables 21,22,23,24 in the network cable 200 that are broken lines not to operate or not to transmit signals of significance (please note, this invention does not exclude transmission of signals having no significance or effect) to the other one of the network devices 300,400. Likewise, the present invention is capable of controlling a portion of the receiving units (Rx) corresponding to the twisted pair cables 21,22,23,24 in the network cable 200 that are broken lines not to operate or not to receive signals from the other one of the network devices 300,400. Moreover, when the data transmission flow rate is low, a portion of the transmitting units (Tx) and a portion of the receiving units (Rx) can be controlled not to operate. Therefore, aside from enabling establishment of a connection between the network devices 300,400 using data transmission rates comparatively higher than those associated with a network standard, when, according to the network standard specifications, there are an insufficient number of the twisted pair cables 21,22,23,24 (data transmission lines) in the network cable 200 (transmission cable) or an insufficient number of the twisted pair cables 21,22,23,24 capable of supporting a normal connection among a sufficient number of the twisted pair cables 21,22,23,24, the present invention is also able to reduce power consumption through controlling a portion of the transmitting units (Tx) and/or receiving units (Rx) not to operate when there is an insufficient number of the twisted pair cables 21,22,23,24 in the network cable 200 or an insufficient number of the twisted pair cables 21,22,23,24 capable of supporting a normal connection among a sufficient number of the twisted pair cables 21,22,23,24, or when there is a reduction in the data transmission flow rate that makes operation of all the receiving units (Rx) and transmitting units (Tx) unnecessary.

Assuming the four transmitting pins of the RJ45 connector of the network device 300,400 are connected respectively to the receiving units (Rx) of the network device 300,400, and that the four receiving pins of the RJ45 connector of the network device 300,400 are connected respectively to the transmitting units (Tx) of the network device 300,400, the line detecting circuits 32 of the master network device 300 then detects a line status, that is, whether the number of the twisted pair cables 21,22,23,24 in the network cable 200 is insufficient or a portion of a sufficient number of the twisted pair cables 21,22,23,24 are not capable of supporting a normal connection. When the detection result indicates, for example, that only three of the twisted pair cables 21,22,23 can be used for data transmission, the controller 31 instructs three of the four transmitting units (Tx) to transmit signals to three of the four receiving units (Rx) of the slave network device 400 through three of the four transmitting pins connected respectively to the three of the twisted pair cables 21,22,23 that are capable of supporting a connection. The slave network device 400 receives the signals from the master network device 300 through three of the four receiving pins that are connected respectively to the three of the twisted pair cables 21,22,23,24 capable of supporting a normal connection.

After the network devices 300,400 have established a connection, the controller 31 can further, based on a data transmission flow rate between the network devices 300,400, adjust the number of the transmitting units (Tx) and receiving units (Rx) that are in operation. For instance, if the data transmission flow rate between the network devices 300,400 is low enough so that it is only necessary to operate two of the transmitting units (Tx) and two of the receiving units (Rx), the controller 31 can control one of the three transmitting units (Tx) originally in operation and one of the three receiving units (Rx) originally in operation not to operate so as to reduce power consumption. Or, in the event that the two network devices 300,400 have different data transmission flow rates, such as when the data transmission flow rate of the master network device 300 is greater than the data transmission reception flow rate of the master network device 300, and the data transmission flow rate of the slave network device 400 is less than the data reception flow rate of the slave network device 400, then the controller 31 can control two of the three receiving units (Rx) of the master network device 300 originally in operation not to operate, and two of the three transmitting units (Tx) of the master network device 300 originally in operation not to operate so as to reduce power consumption. Similarly, when the controller 31 detects an increase in the data transmission flow rate, the controller 31 can restore the transmitting units (Tx) and the receiving units (Rx) that are idle on account of a previous reduction in the data transmission and reception flow rates so as to meet the transmission demands of an increased data transmission flow rate.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A wired network connection establishing method adapted for a wired network, the wired network including a network cable and two network devices connected through the network cable, the network cable including a plurality of twisted pair cables, the plurality of twisted pair cables including at least first and second twisted pair cables, the wired network connection establishing method comprising:
configuring the two network devices to exchange connection capacity information with each other through the first and second twisted pair cables, the connection capacity information including at least a first connection mode using four of the twisted pair cables, a second connection mode using three of the twisted pair cables, and a third connection mode using two of the twisted pair cables;
configuring the two network devices to detect the number of the twisted pair cables capable of supporting a normal connection in the network cable; and
configuring the two network devices to determine which one of the first, second, and third connection modes is to be used for establishing a connection based on the number of the twisted pair cables capable of supporting a normal connection.

2. The wired network connection establishing method as claimed in claim 1, the wired network being an Ethernet network, wherein the first connection mode is a 10 Gbps data transmission rate mode, the second connection mode is a 7.5 Gbps data transmission rate mode, and the third connection mode is a 5 Gbps data transmission rate mode.

3. The wired network connection establishing method as claimed in claim 1, the wired network being an Ethernet network, wherein the first connection mode is a 1000 Mbps data transmission rate mode, the second connection mode is a 750 Mbps data transmission rate mode, and the third connection mode is a 500 Mbps data transmission rate mode.

4. The wired network connection establishing method as claimed in claim 1, wherein the first, second and third connection modes are indicated using respective identification codes.

5. The wired network connection establishing method as claimed in claim 1, wherein an N-way mechanism is used to exchange the connection capacity information between the two network devices.

6. The wired network connection establishing method as claimed in claim 1, wherein:
when the number of the twisted pair cables capable of supporting a normal connection is four, and the two network devices both support the first connection mode, the two network devices are configured to use the first connection mode for establishing a connection;

when the number of the twisted pair cables capable of supporting a normal connection is three, and the two network devices both support the second connection mode, the two network devices are configured to use the second connection mode for establishing a connection; and when the number of the twisted pair cables capable of supporting a normal connection is two, and the two network devices both support the third connection mode, the two network devices are configured to use the third connection mode for establishing a connection.

7. A network device adapted for establishing a connection with a remote network device through a network cable, the network device comprising:

four receiving/transmitting circuits for connecting respectively with four twisted pair cables in the network cable; and a controller coupled to the four receiving/transmitting circuits for controlling operation of the four receiving/transmitting circuits; wherein the controller exchanges connection capacity information with the remote network device through first and second ones of the four twisted pair cables of the network cable, the connection capacity information including at least a first connection mode using the four twisted pair cables, a second connection mode using three of the four twisted pair cables, and a third connection mode using two of the four twisted pair cables, detects the number of the twisted pair cables capable of supporting a normal connection among the four twisted pair cables in the network cable, and controls the receiving/transmitting circuits to establish a connection with the remote network device using one of the first, second, and third connection modes based on the number of the twisted pair cables capable of supporting a normal connection and the connection capacity information of both the network device and the remote network device.

8. The network device as claimed in claim 7, the network cable being an Ethernet network cable, wherein the first connection mode is a 10 Gbps data transmission rate mode, the second connection mode is a 7.5 Gbps data transmission rate mode, and the third connection mode is a 5 Gbps data transmission rate mode.

9. The network device as claimed in claim 7, the network cable being an Ethernet network cable, wherein the first connection mode is a 1000 Mbps data transmission rate mode, the second connection mode is a 750 Mbps data transmission rate mode, and the third connection mode is a 500 Mbps data transmission rate mode.

10. The network device as claimed in claim 7, wherein:

when the controller detects that the number of the twisted pair cables capable of supporting a normal connection is four, and the remote network device supports the first connection mode, the controller controls the four receiving/transmitting circuits to establish a connection with the remote network device using the first connection mode;

when the controller detects that the number of the twisted pair cables capable of supporting a normal connection is three, and the remote network device supports the second connection mode, the controller controls three of the four receiving/transmitting circuits to establish a connection with the remote network device using the second connection mode; and when the controller detects that the number of the twisted pair cables capable of supporting a normal connection is two, and the remote network device supports the third connection mode, the controller controls two of the four receiving/transmitting circuits to establish a connection with the remote network device using the third connection mode.

11. The network device as claimed in claim 7, wherein the network device is a master network device, and further includes four line detecting circuits coupled respectively to the four receiving/transmitting circuits, each of the line detecting circuits detecting whether one of the four twisted pair cables that is connected to the corresponding one of the four receiving/transmitting circuits is a broken line, and transmitting a detection result to the controller.

12. The network device as claimed in claim 7, wherein the network device is a slave network device, and the controller detects whether each of the four receiving/transmitting circuits that are connected respectively to the four twisted pair cables receives signals so as to determine whether each of the four twisted pair cables is a broken line.

* * * * *